(12) United States Patent
Gerbino et al.

(10) Patent No.: US 10,487,634 B2
(45) Date of Patent: Nov. 26, 2019

(54) ENHANCING THE EFFECTS OF A LOW-PRESSURE ZONE SURROUNDING A WELL BORE VIA RADIAL DRILLING BY INCREASING THE CONTACT ZONE FOR RESIDENT MICROBIAL ENHANCED OIL RECOVERY

(71) Applicant: TITAN OIL RECOVERY, INC., Beverly Hills, CA (US)

(72) Inventors: Kenneth J. Gerbino, Beverly Hills, CA (US); Colin Kenneth Hill, San Dimas, CA (US)

(73) Assignee: Titan Oil Recovery, Inc., Beverly Hills, CA (US)

( * ) Notice: Subject to any disclaimer, the term of this patent is extended or adjusted under 35 U.S.C. 154(b) by 0 days.

(21) Appl. No.: 16/145,853

(22) Filed: Sep. 28, 2018

(65) Prior Publication Data
US 2019/0100983 A1    Apr. 4, 2019

Related U.S. Application Data

(60) Provisional application No. 62/565,197, filed on Sep. 29, 2017.

(51) Int. Cl.
*E21B 43/22* (2006.01)
*E21B 43/16* (2006.01)
(Continued)

(52) U.S. Cl.
CPC .............. *E21B 43/16* (2013.01); *C09K 8/582* (2013.01); *E21B 7/046* (2013.01)

(58) Field of Classification Search
CPC .......... E21B 43/16; E21B 43/26; E21B 21/00; E21B 21/062; E21B 43/006; E21B 7/00; E21B 47/1015
See application file for complete search history.

(56) References Cited

U.S. PATENT DOCUMENTS

| 5,435,400 A | 7/1995 | Smith et al. |
|---|---|---|
| 9,650,561 B2 | 5/2017 | Sheehy et al. |

(Continued)

OTHER PUBLICATIONS

International Searching Authority, "Notification of Transmittal of the International Search Report and the Written Opinion of the International Searching Authority", for PCT/US2018/053662, dated Nov. 20, 2018, 10 pages.

*Primary Examiner* — Zakiya W Bates
(74) *Attorney, Agent, or Firm* — Zarley Law Firm, PLC

(57) ABSTRACT

The present invention relates to a system and method of increasing low pressure zones for microbial enhanced oil recovery through radially drilled narrow, high surface area bore holes around a well bore. A drill string is inserted into the well bore and is thereafter directed horizontally and perpendicularly from the well bore by a tool at the end of the radial drill to create the narrow, high surface area bore holes. These bore holes extend through surface materials including pipes, casings, cement, rock material and the like. The drill is then rotated a distance about the well bore. The process may then be repeated to create bore sets positioned below or above one another relative to a pay zone. The process lowers the pressure gradient along a skin around the well bore and a larger surface area extending away from the well bore to create a larger oil drainage and microbial interaction area. The invention further includes injecting a nutrient package formulated to activate resident microbes such that the microbial morphology is physically changed which in turn increases the relative permeability of the oil, water, and rock interaction thereby enhancing overall oil production and recovery.

12 Claims, 4 Drawing Sheets

(51) Int. Cl.
*E21B 7/04* (2006.01)
*C09K 8/582* (2006.01)

(56) References Cited

U.S. PATENT DOCUMENTS

| | | |
|---|---|---|
| 2002/0162689 A1 | 11/2002 | Mazorow et al. |
| 2006/0048946 A1 | 3/2006 | Al-Muraikhi |
| 2008/0017416 A1 | 1/2008 | Watson et al. |
| 2011/0061937 A1 | 3/2011 | Orban et al. |
| 2011/0250582 A1 | 10/2011 | Gates et al. |
| 2014/0367088 A1 | 12/2014 | Sheehy et al. |

ENHANCING THE EFFECTS OF A LOW-PRESSURE ZONE SURROUNDING A WELL BORE VIA RADIAL DRILLING BY INCREASING THE CONTACT ZONE FOR RESIDENT MICROBIAL ENHANCED OIL RECOVERY

CROSS REFERENCE TO RELATED APPLICATION

This application claims the benefit of the priority of U.S. Provisional Application No. 62/565,197 filed Sep. 29, 2017, the contents of these applications are hereby incorporated by reference in their entirety.

BACKGROUND OF THE INVENTION

This invention is directed to a system and method for enhancing oil recovery using radial drilling and microbial activation further from the well bore.

The process of enhancing oil recovery through treatment of microorganisms using a specific nutrient formulation is known in the art. As an example, a process is disclosed in U.S. Pat. No. 9,650,561, incorporated by reference herein in its entirety.

Generally, the process identifies certain types of resident bacteria or microorganisms in sandstone and carbonate oil bearing structures. The resident microbes are tested to determine a nutrient formulation that physiologically activates the resident microbe upon treatment. The activation leads to a change from the resident microbe's hydrophilic to hydrophobic physiology and this in turn leads to physical changes at a micro level that changes the relative permeability of the oil, water, and rock interaction.

Microbial enhanced oil recovery depends on two factors. First, enhanced oil recovery depends on how far the nutrients are initially pushed from the well bore by the nutrient injection followed by injection of produced water and shut in. This factor is limited by the cost of the nutrient formulation and the pumping time required.

Second, microbial enhanced oil recovery depends upon how far a natural diffusion process and possible water movement process will carry the nutrients from the well bore over time. The problem with this factor is that it is a slow process and is limited by permeability of the reservoir rock.

Accordingly, a need exists in the art for a system and process that addresses these deficiencies.

SUMMARY OF THE INVENTION

In general, the present invention relates to a method for increasing oil production and recovery by using radial drilling and microbial activation further from a well bore. The method includes at least an initial set of narrow, high surface area bore holes drilled horizontally and radially around a vertical well bore. The process may then be repeated to create several sets of bore holes extending from the well bore above and below the initial set. The pressure is therefore lowered throughout the large surface area created by the boreholes at a distance from the well bore. Further, the method includes injecting a predetermined nutrient package suitable for resident microbe activation such that the microbes undergo morphological change that enhances the relative permeability of the oil, water, and rock interaction, thus increasing overall oil production and recovery from the reservoir.

DETAILED DESCRIPTION

Figure 1:
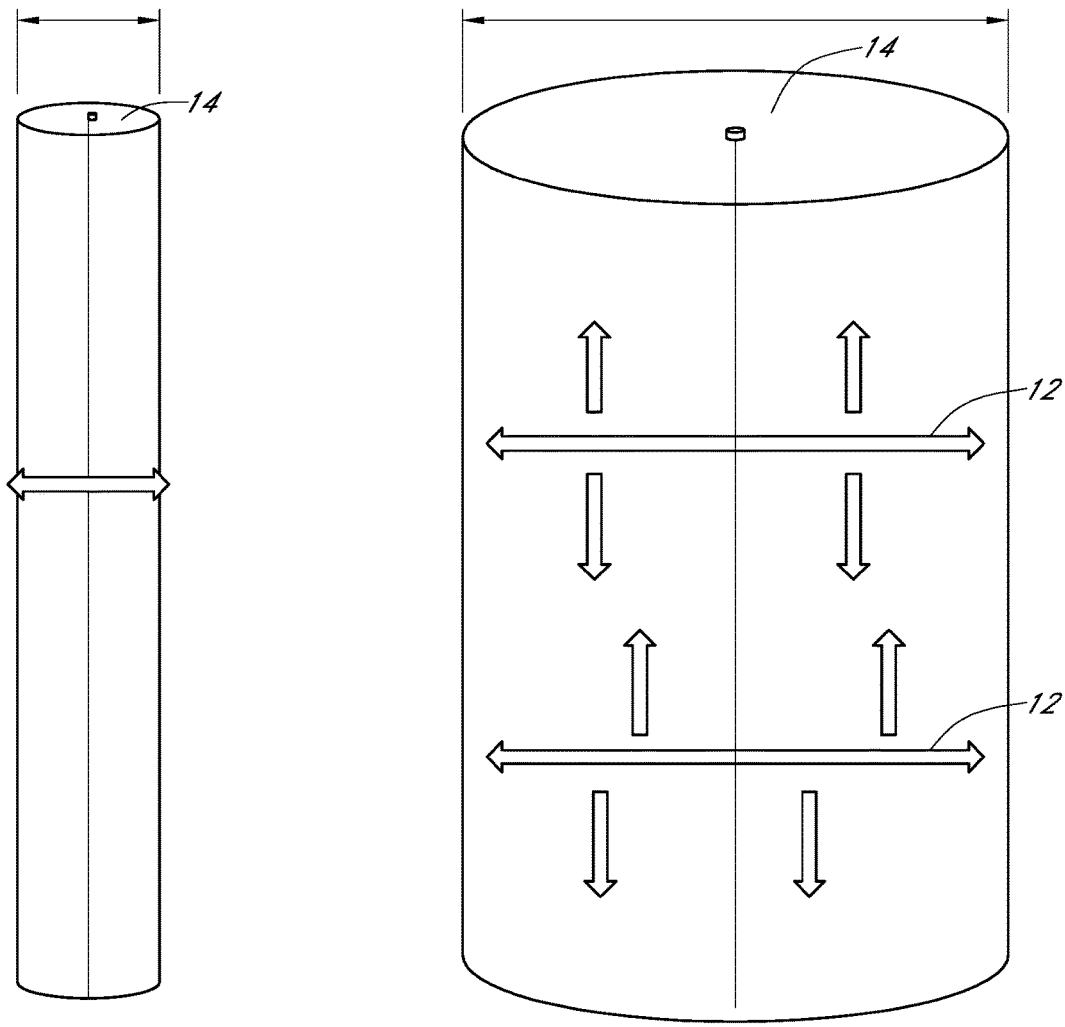
FIG. 1 is a side view of the bores.
Figure 2:
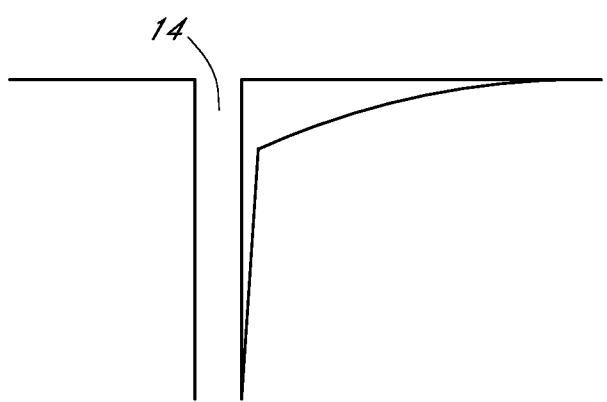
FIG. 2 is a top view of a process of increasing low pressure zones for microbial enhanced oil recovery.
Figure 3:
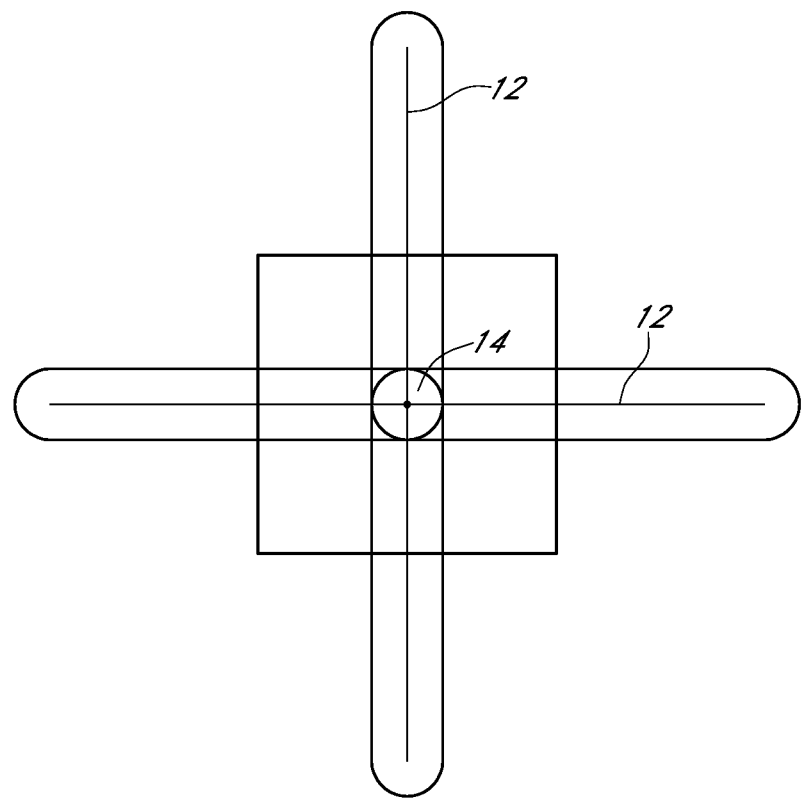
FIG. 3 is a top and cross-sectional view of a process of increasing low pressure zones for microbial enhanced oil recovery.
Figure 4:
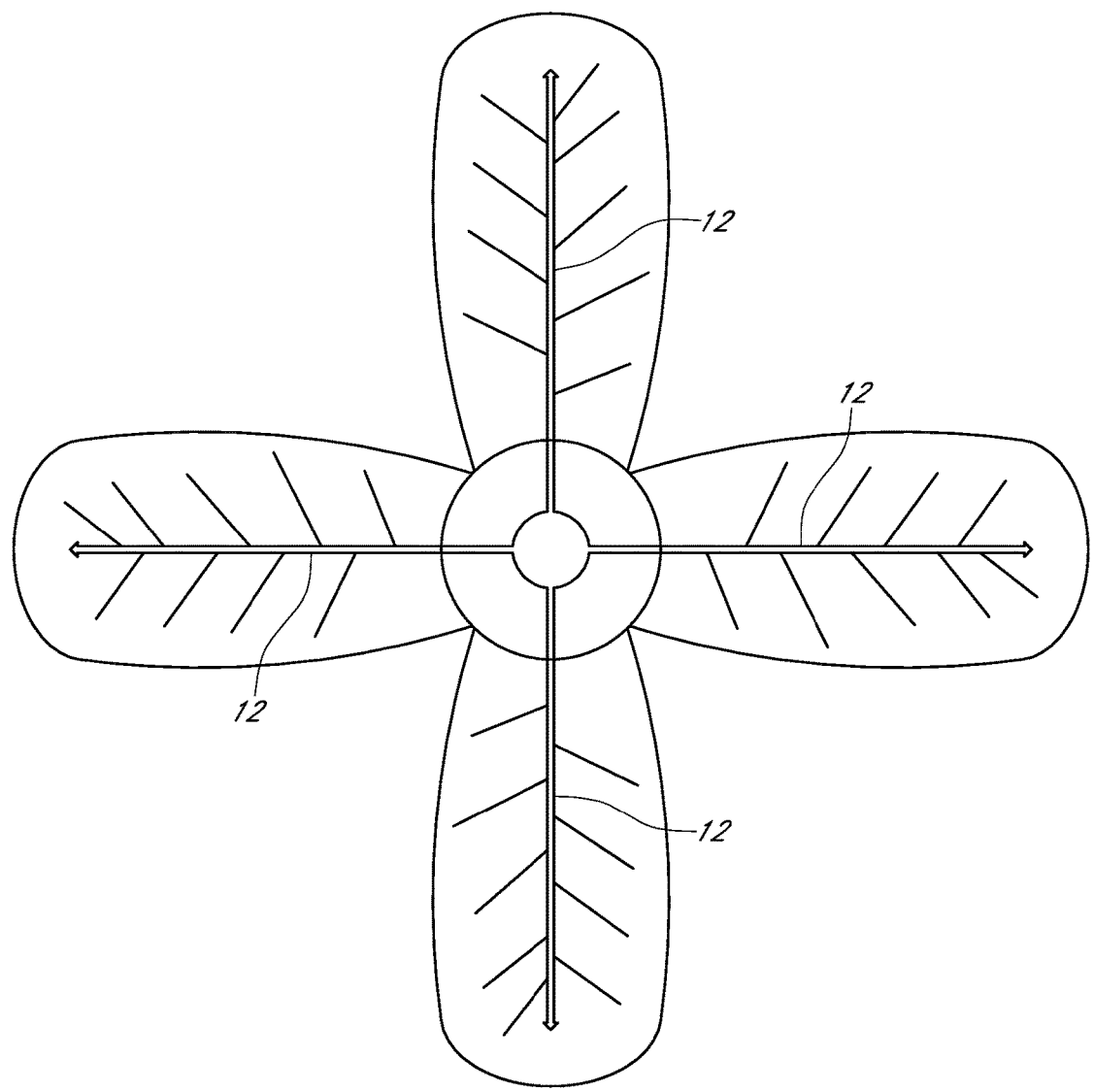
FIG. 4 is a top view of a process of increasing low pressure zones for microbial enhanced oil recovery.

As shown in the Figures, the process 10 of increasing low pressure zones for microbial enhanced oil recovery begins by drilling a plurality of narrow but high surface area bore holes 12 radially and perpendicular from a well bore 14. Preferably the bore holes 12 are created using a radial drill.

As an example, the radial drill, which is not expensive, utilizes a one inch diameter drill or spaghetti string. The drill string is inserted into the well bore 14 and using a tool on the end of the drill, the drill string is directed horizontally and drills a hole through pipe/casings or cement and then preferably thirty to one hundred feet or more. The drill string is then retracted into the primary well bore 14 and the drill is rotated a predetermined distance and the process is repeated. Preferably four to eight radial holes 12 drilled in North, East, South and West directions in relation to the primary well bore 14 or fractions between. A second set of radial holes 12 can be drilled ten to twenty feet below the first set. For example, if the pay zone is fifty feet then the first set of radial drill holes could be drilled fifteen feet below the top of the pay zone and a second set fifteen feet below the first set. Longer pay zones can result in more sets of horizontal lateral radial holes stacked above or below the initial radial drill holes from the primary well bore hole.

Next, a tested and determined nutrient formulation designed to activate resident microbes is injected into the well bore 14. The radial holes 12 provide extra outlets that allows reservoir fluids including water to flow more easily toward the producer and thus lowers pressure further away from the well bore and over a larger area that the new radial well bore 14 creates. A larger drainage area is now created by the lower pressure area and the microbial interaction saturation in that area. The nutrient stimulated activation of the microbes further enhances the overall effect as relative permeability (See U.S. Pat. No. 9,650,561) is also changed making it easier for the oil to flow from rock pores into the new streams created. This leads to a larger area of positive flow of oil toward the well bore as a result of the interaction with the activated microbes and ultimately increased oil well production.

If the plurality of bore holes 12 are used in an injector situation, the result is the creation of a much larger surface area to push the nutrient formula more efficiently into the rock formation and if the water flow direction is known for a particular producer well nearby, the radial drilling of the holes 12 can be aimed in the direction of the producer well to increase the likelihood of activation of resident microbes and flow toward the producer well.

In one example, a normal extension nutrient flow from a producing well bore 14 using a single application is approximately two meters in all directions. By adding radial holes 12 in just four directions, using two sets of radial holes 12, the nutrient formulation would saturate a larger volume of reservoir rock. For a thirty foot vertical well bore with sixty feet radial holes, the microbial influenced rock matrix saturation is increased ten times. The process is also used with injection wells.

Considering that 65% of oil surrounding wells is trapped, this new nutrient delivery system would have a dramatic effect on oil recovery. One of the advantages of the delivery system is that it increases the surface area for rock, oil and water interaction with the microbes present. Another advantage is the system increases volume outside of the natural oil production zone for potential oil recovery. The increase of volume and surface area of interaction between activated microbial species and pore space results in greater oil release via changes in relative permeability.

The system also avoids the zones where water would carry nutrients away too rapidly for microbial interaction and leads to a larger and longer increase in production from the well. Finally, if production begins to drop off, additional sets of radial holes 12 are drilled prolonging the life of a mature oil well. Accordingly, a process and delivery system for enhancing oil recovery has been disclosed that at the very least meets all the stated objectives.

From the above discussion and accompanying figures and claims it will be appreciated that the system and process of increasing low pressure zones for microbial enhanced oil recovery 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A method of increasing low pressure zones for microbial enhanced oil recovery comprising:
    drilling a plurality of narrow, high surface area bore holes radially and perpendicularly from a vertical well bore by a radial drill;
    inserting a one inch diameter drill string of the radial drill in to the well bore;
    directing the drill string horizontally by a tool at the end of the radial drill to drill a first bore hole through surface materials;
    retracting the drill string in to the well bore;
    rotating the drill around the well bore a predetermined distance from the first bore hole of the plurality of narrow, high surface area bore holes;
    repeating the process to create at least a second, third, and fourth bore hole of the plurality of narrow, high surface area bore holes creating a first set of bore holes;
    injecting a tested and determined nutrient formulation designed to activate resident microbes into the well bore such that the nutrient formulation and reservoir fluids flow toward a producer well;
    increasing a microbial influenced rock matrix saturation of the well bore by at least ten times at a ratio of thirty feet of the vertical well bore to sixty feet of the plurality of narrow, high surface area bore holes;
    lowering the pressure at a skin area a distance from the well bore and over a larger area created by the set of bore holes such that large low pressure microbial saturation zones are created; and
    wherein lowering the pressure creates a large area of positive flow or oil toward the well bore due to the interaction with activated microbes such that oil well production and recovery are increased.

2. The method of claim 1 wherein the surface materials are pipes, casings, or cement.

3. The method of claim 1 wherein the plurality of narrow, high surface area bore holes extend 30 to 100 feet or more into the reservoir from the well bore.

4. The method of claim 1 wherein the process is repeated such that a complete radial circle is formed around the well bore.

5. The method of claim 1 wherein 4 to 8 narrow, high surface area bore holes are drilled in North, East, South and West directions in relation to the well bore or fractions between.

6. The method of claim 1 further comprising at least a second set of bore holes drilled between 10 and 20 feet below the first set of bore holes.

7. The method of claim 6 wherein a the first set of bore holes is drilled 15 feet below the top of a pay zone and the second set of bore holes is drilled fifteen feet below the first set of bore holes.

8. The method of claim 1 wherein the narrow, high surface area bore holes provide extra outlet streams allowing reservoir fluids to flow toward the producer such that pressure within the reservoir, at a distance from the well bore, and over a large area extending through the narrow, high surface area bore holes is lowered.

9. The method of claim 1 wherein the activated microbes increase the relative permeability such that oil flows from rock pores into the narrow, high surface area bore holes.

10. The method of claim 1 wherein the narrow, high surface area bore holes are drilled radially toward the producer well such that the likelihood of activation of resident microbes and flow toward the producer well is increased.

11. The method of claim 1 wherein nutrient flow from a well bore having 2 sets of 4 narrow, high surface area bore holes saturates a larger area of rock reservoir than well bore with no narrow, high surface area bore holes.

12. The method of claim 1 wherein the process is used with injection wells.

* * * * *